United States Patent
Shen et al.

(10) Patent No.: US 11,190,434 B2
(45) Date of Patent: Nov. 30, 2021

(54) SYSTEMS AND METHODS FOR PROTECTIVE PROACTIVE ADAPTIVE ACTIVE BANDWIDTH MEASUREMENT IN SD-WAN NETWORKS

(71) Applicant: Cisco Technology Inc., San Jose, CA (US)

(72) Inventors: Changhong Shen, Shanghai (CN); Hongbo Xia, Shanghai (CN); Xiao-Rong Wang, Shanghai (CN); Yu Zhang, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/819,940

(22) Filed: Mar. 16, 2020

(65) Prior Publication Data
US 2021/0288898 A1    Sep. 16, 2021

(51) Int. Cl.
*H04L 12/26*    (2006.01)
(52) U.S. Cl.
CPC .............. *H04L 43/50* (2013.01); *H04L 43/04* (2013.01); *H04L 43/0882* (2013.01)
(58) Field of Classification Search
None
See application file for complete search history.

(56) References Cited

U.S. PATENT DOCUMENTS

| | | |
|---|---|---|
| 9,686,127 B2 | 6/2017 | Ramachandran et al. |
| 10,091,078 B2 | 10/2018 | Iyer et al. |
| 2009/0201807 A1 * | 8/2009 | Bugenhagen ........... H04L 47/11 370/230 |
| 2013/0103821 A1 * | 4/2013 | Gonia ................... H04W 24/06 709/224 |
| 2016/0028637 A1 * | 1/2016 | Vasseur .................. H04L 47/25 370/235 |
| 2017/0141990 A1 * | 5/2017 | Amulothu ........... H04L 41/0806 |
| 2018/0331970 A1 * | 11/2018 | Lehane ............... H04L 41/5019 |

(Continued)

OTHER PUBLICATIONS

*NetScaler SD-WAN 10.0* Citrix Product Documentation, docs.citrix.com. (Title page, Index pages, and pp. 319-336), Jan. 6, 2020.

(Continued)

*Primary Examiner* — Joshua Joo
(74) *Attorney, Agent, or Firm* — Baker Botts, LLP (57) ABSTRACT

The present disclosure is directed to determining bandwidth capacity in a WAN path and includes one or more processors and one or more computer-readable non-transitory storage media comprising instructions that, when executed by the one or more processors, cause one or more components of the system to perform operations including, selecting a SD-WAN path for which to determine bandwidth capacity, wherein the path is associated with a Quality of Service (QoS) shaper having a pre-determined shaper rate, incrementally increasing a test load applied on the selected path, wherein the test load is applied concurrently with existing user traffic, calculating a performance score for the path after each increase in the test load, determining a performance of the path based on the calculated performance score, and updating the shaper rate of the QoS shaper based on the performance of the path.

17 Claims, 4 Drawing Sheets

(56) References Cited

U.S. PATENT DOCUMENTS

| | | |
|---|---|---|
| 2019/0149474 A1 | 5/2019 | Iyer et al. |
| 2019/0349259 A1* | 11/2019 | Rovner ............... H04L 43/0894 |
| 2019/0363967 A1* | 11/2019 | Yun ........................ H04L 43/10 |
| 2021/0092062 A1* | 3/2021 | Dhanabalan .......... H04L 43/087 |

OTHER PUBLICATIONS

*SD-WAN* Barracuda Campus, https://campus.barracuda.com/product/cloudgenfirewall/doc/79462906/sd-wan/, Last updated Sep. 2, 2019.

\* cited by examiner

SYSTEMS AND METHODS FOR PROTECTIVE PROACTIVE ADAPTIVE ACTIVE BANDWIDTH MEASUREMENT IN SD-WAN NETWORKS

TECHNICAL FIELD

The present disclosure generally relates to software-defined wide area networks (SD-WANs), and more specifically to systems and methods for protective proactive adaptive active bandwidth measurement in SD-WAN networks.

BACKGROUND

The SD-WAN is the future of the enterprise WAN. Supporting a variety of connectivity options, including digital subscriber lines (DSL), microwave links, and 3G/4G/LTE links, the SD-WAN may efficiently deliver cloud-based applications, data, and services and by allowing a user to select the appropriate access connection for optimal performance. The actual bandwidth available through these connections may vary at any given time. For example, the available bandwidth for DSL and Internet links may depend on the number of concurrent users and the degree of congestion on the link. Bandwidth availability in microwave links may be dependent on atmospheric conditions. Likewise, 3G/4G/LTE uplink and downlink speeds may vary based on multi-user scalability, topography, and/or weather conditions.

DESCRIPTION OF EXAMPLE EMBODIMENTS

Overview

According to an embodiment, a system may include one or more processors and one or more computer-readable non-transitory storage media comprising instructions that, when executed by the one or more processors, cause one or more components of the system to perform operations including, selecting a SD-WAN path for which to determine bandwidth capacity, wherein the path is associated with a Quality of Service (QoS) shaper having a pre-determined shaper rate, incrementally increasing a test load applied on the selected path, wherein the test load is applied concurrently with existing user traffic, calculating a performance score for the path after each increase in the test load, determining a performance of the path based on the calculated performance score, and updating the shaper rate of the QoS shaper based on the performance of the path.

Moreover, the path may be selected when its bandwidth utilization exceeds a pre-determined maximum threshold, or when its performance is degraded below a pre-determined minimum threshold. Also, the test load may be configured to bypass one or more policies of the QoS shaper.

Additionally, the performance score may be a Quality of Experience score that is based on a numerical composite calculation derived from active and passive performance metrics, wherein the active performance metrics are associated with the test load, and the passive performance metrics are associated with the existing user traffic traversing the WAN path. The calculated performance score may correspond to one of a plurality of performance grades indicating the performance of the path.

Furthermore, the operation of updating the shaper rate comprises one of increasing the shaper rate, decreasing the shaper rate, or maintaining the shaper rate.

According to another embodiment, a method may include the steps of selecting a SD-WAN path on which to measure bandwidth capacity, wherein the path is associated with a QoS shaper having a pre-determined shaper rate, incrementally increasing a test load applied on the selected path, wherein the test load is applied concurrently with existing user traffic, calculating a performance score for the path after each increase in the test load, determining a performance of the path based on the calculated performance score, and updating the shaper rate of the QoS shaper based on the performance of the path.

According to yet another embodiment, one or more computer-readable non-transitory storage media may embody instructions that, when executed by a processor, cause the performance of operations, including selecting a SD-WAN path on which to measure bandwidth capacity, wherein the path is associated with a QoS shaper having a pre-determined shaper rate, incrementally increasing a test load applied on the selected path, wherein the test load is applied concurrently with existing user traffic and is configured to bypass one or more policies of the QoS shaper, calculating a performance score for the path after each increase in the test load, determining a performance of the path based on the calculated performance score, and updating the shaper rate of the QoS shaper based on the performance of the path.

Technical advantages of certain embodiments of this disclosure may include one or more of the following. The systems and methods described herein may allow for the reliable and effective determination of bandwidth capacity on a WAN path by utilizing an adaptive active bandwidth measurement test, which may be a repeatable process generally comprising three operations: 1) initiating a controlled speed test; 2) conducting a Quality of Experience (QoE) performance measurement; and 3) verifying and updating the bandwidth. The adaptive active bandwidth measurement test allows for the testing of WAN path performance while bypassing a QoS shaper associated with the WAN path, and without impact to existing user traffic. Based on the results of the adaptive active bandwidth measurement test, the WAN path may be updated to allow for improved traffic flow.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

A SD-WAN provides a virtual WAN architecture that allows enterprises to integrate any combination of connectivity services, e.g., MPLS, LTE, Internet, to securely connect a one or more sites, nodes, or points within a network. While each of these connectivity services may have unique advantages and disadvantages, they share at least one common limitation—each has a static bandwidth capacity which is often pre-determined by the service provider. However, the offered bandwidth capacity may not always correspond to the actual available bandwidth. Conditions such as high user traffic, congestion, weather and atmospheric conditions, topography, quality of the wiring or router, etc. may all impact actual available bandwidth.

There are various conventional approaches to testing available bandwidth capacity on a WAN path including, inter alia, the speed test and the loss measurement test. The speed test is generally used to test link capacity during network provisioning. In a speed test, the maximum available bandwidth is utilized to transfer a burst of data from a first site to a second site. Because the speed test necessarily requires maximum bandwidth, it would severely impact concurrent user traffic and is therefore typically conducted when initiating network capability or at non-busy hours.

The loss measurement test is generally directed to transmission of data packets between a sender site and a receiver site, and then measuring the quantitative rate difference between the two. When the sender rate is greater than the receiver rate, a confirmed loss has occurred. One limitation of the loss measurement test is that it may only be applied between enterprise components in a network (e.g., between branches, data centers, etc.), and is not effective to measure a Direct Internet Access or Direct Cloud Access (DIA/DCA) branch WAN path.

The present disclosure introduces systems and methods for determining available bandwidth on a WAN path via an adaptive active bandwidth measurement test, which may generally comprise three operations: 1) initiating a controlled speed test; 2) conducting a QoE performance measurement; and 3) verifying and updating the bandwidth. One of more these three operations may be repeated for each bandwidth test cycle, as described more fully below. The proposed solution may be applied to various use cases, such as measurement of bandwidth capacity in DIA/DCA branch WAN paths as well paths between enterprise components (e.g., Hub/Spoke links), and may be conducted with little or no impact to existing user traffic.

Figure 1:
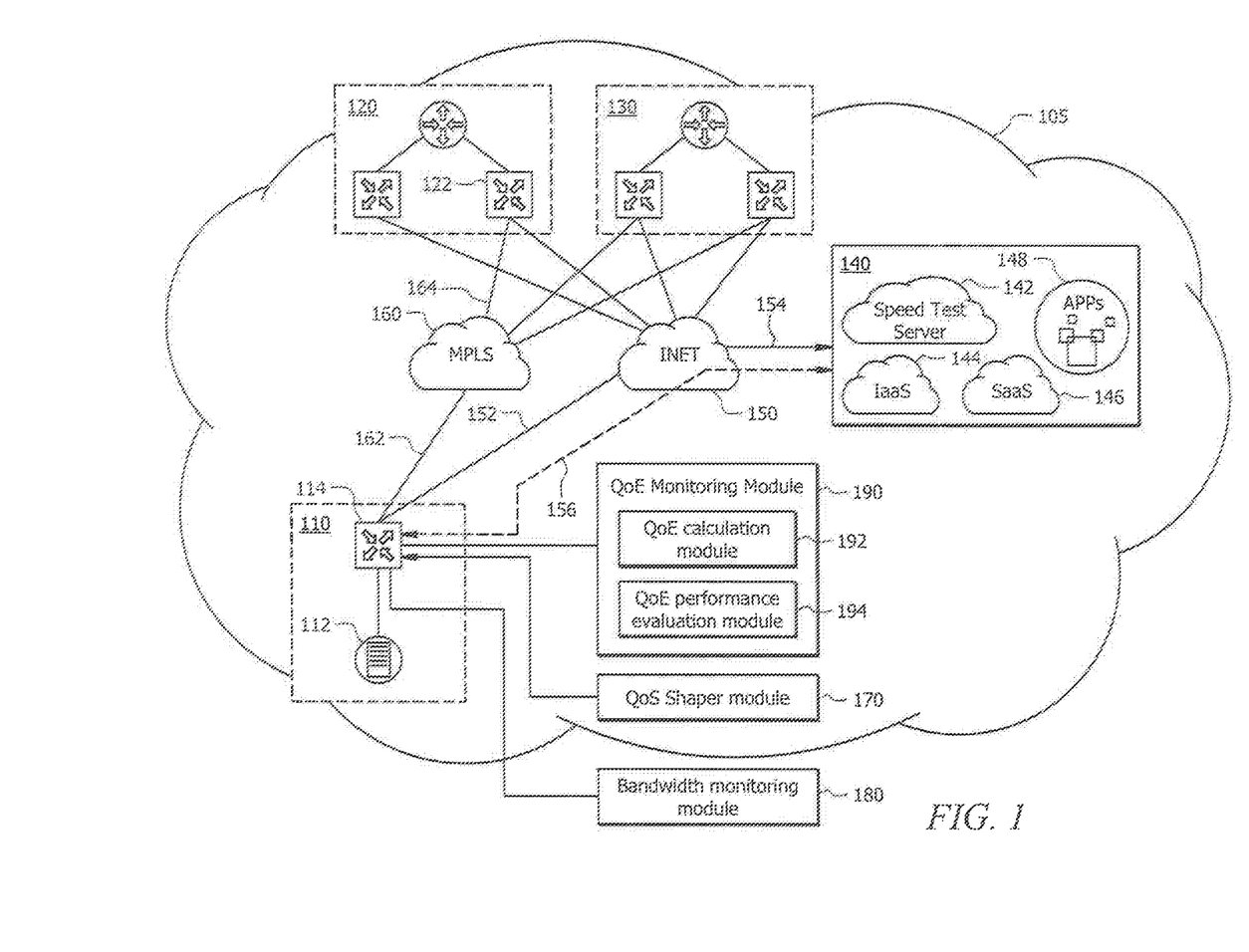
FIG. 1 illustrates a system for measuring bandwidth capacity of a WAN path, in accordance with certain embodiments.

FIG. 1 depicts a system 100 for determining the bandwidth capacity of a WAN path. System 100 may comprise a branch site 110 having a data center 112 communicatively coupled via a branch router 114 to one or more points in the SD-WAN fabric 105 of the network. By way of example, branch site 110 may be communicatively coupled to the one or more data centers 120, 130, the cloud 140, the enterprise (not shown), other branch sites (not shown), and/or other connection points in the network. Each connection is established via a WAN path through a connectivity service. For example, branch site 110 may be connected to a router 122 in data center 120 through WAN paths 162 and 164 via a MPLS connection 160. Likewise, branch site 110 may be connected to the cloud 140 through WAN paths 152 and 154 via an Internet connection 150. The cloud 140 may host cloud application services such as Infrastructure as a Service (IaaS) applications 144, Software as a Service (SaaS) applications 146, and other cloud-based applications 148, all of which may be accessed by the branch site 110 via the Internet connection 150 through WAN paths 152 and 154. Branch site 110 may also have direct access to the Internet 150 via WAN path 152. Each of these WAN paths 152, 154, 162, 164 may have an associated static bandwidth capacity, as pre-determined by the service provider. However, the actual bandwidth available on each WAN path 152, 154, 162, 164 may fluctuate based on user traffic, weather, and other conditions. For purposes of simplicity, the systems and methods of the present disclosure will be described in conjunction with WAN paths 152, 154, which a enable DIA/DCA link between the branch site 100 and the Internet 150 and the cloud 140, respectively. However, it is to be understood that the present disclosure is not to be so limited, and that the systems and methods described herein may apply to any WAN path connecting any points, sites, or nodes within a network.

Branch site 110 may include a branch router 114. The branch router 114 may be communicatively coupled to a QoS shaper module 170, a bandwidth monitoring module 180, and a QoE monitoring module 190. Each of these will be described in turn.

System 100 may include a QoS shaper module 170, which implements a QoS shaper for one or more WAN paths 152, 154 that directly or indirectly egress from branch router 114. The QoS shaper may ensure and allocate bandwidth for prioritized traffic and applications, based on the priority assigned by a user through the branch router 114. In an embodiment, the QoS shaper may include four traffic classes, each class having an allocated bandwidth or rate. The four traffic classes may include "Critical Priority," "Business," "Best Effort," and "Bulk." In an embodiment, the QoS shaper may include greater traffic classes or fewer traffic classes than the traffic classes listed above.

System 100 may further include a bandwidth monitoring module 180 communicatively coupled with branch router 114. Bandwidth monitoring module 180 may monitor the bandwidth utilization and capacity for one or more WAN paths 152, 154 directly or indirectly egressing from branch router 114, and may be configured to determine bandwidth capacity on a WAN path 152, 154 and to initiate an adaptive active bandwidth measurement test for a WAN path 152, 154

System 100 may also include a QoE monitoring module 190 comprising a QoE calculation module 192 and a QoE performance evaluation module 194. The QoE monitoring module 190 may be communicatively coupled to branch router 114, and may monitor the QoE metrics (including by calculating and evaluating calculated QoE metrics) to determine the performance of a given WAN path 152, 154. In an embodiment, the QoE monitoring module 190 may calculate and evaluate the QoE metrics for the WAN path 152, 153 in conjunction with the controlled speed test, more specifically, after each incremental load is applied by the controlled speed test. In other embodiments, the QoE monitoring module 190 may monitor the performance of the WAN path 152, 154 apart from the controlled speed test, i.e., to determine whether to kick off the adaptive active bandwidth measurement test.

In an embodiment, the QoE monitoring module 190 may comprise a Viptela Quality of Experience (vQoE) monitoring module, and the QoE calculation module 192 and the QoE performance evaluation module 194 may comprise a vQoE calculation module and a vQoE performance evaluation module, respectively. However, it is to be understood that the QoE monitoring module 190, the QoE calculation module 192, and the QoE performance evaluation module are not to be limited, and may comprise any modules that monitor, calculate, and/or evaluate metrics relating to the performance of a path in a network.

The QoE calculation module 192 may calculate a performance score for a WAN path 152, 154. In an embodiment, the performance score may comprise a Viptela Quality of Experience (vQoE) score. The performance score, e.g., a vQoE score, may comprise a numerical composite calculation derived from active and passive metrics. Active metrics may include metrics associated with the transmission of a test load along the WAN path 152, 154, including by way of example, metrics relating to jitter, loss, delay, and latency, which may be measured by bidirectional forwarding detection or other means known in the art. Passive metrics may include metrics associated with concurrent user traffic traversing the WAN path 152, 154. In an embodiment, active and passive metrics may comprise metrics associated with bidirectional forwarding detection protocols used by application-aware routing (e.g., Cisco BFD App-route), controlled speed test with simulated flows, and/or passive application visibility and control (AVC) performance monitoring (including monitoring of customer Transmission Control Protocol and/or User Datagram Protocol (TCP/UDP) data flows). Although the performance score is described herein as a vQoE score, it is to be understood that the present disclosure is not to be so limited. Rather, the performance score may be based on any type of scoring parameters or metrics, such as vQoE, QoE, or otherwise, and may be based on the performance metrics monitored and/or calculated by the QoE calculation module 192.

In an embodiment, the performance score, e.g., vQoE score, may comprise a numeric value ranging from 0-10. A vQoE score of 8 or greater (vQoE≥8) may correspond to a "GREEN" performance grade and may indicate good performance of the WAN path. A vQoE score ranging from 5 to a value less than 8 (5≤vQoE<8) may correspond to a "YELLOW" performance grade and may indicate average or moderate performance of the WAN path. A vQoE score less than 5 (vQoE<5) may correspond to a "RED" performance grade and may indicate poor performance of the WAN path.

Finally, system 100 may further include a speed test server 142, which may reside on the cloud 140, as shown in FIG. 1. The speed test server 142 may be chosen automatically by Domain Name Service (DNS) lookup based on location. In another embodiment, the speed test server may reside in a data center, or any other location on the network, as understood by one of skill in the art.

With continued reference to FIG. 1, in accordance with the present disclosure, when a WAN path 152, 154 is established from the branch site 110 to connection point such as the Internet 150 or the cloud 140, branch router 114 may first validate the default bandwidth capacity of the path by using a conventional Day 0 speed test. The Day 0 speed test may confirm the operational capacity of the WAN path 152, 154. In an example, the default bandwidth capacity of WAN path 152, 154 may be 50 Mbps.

In order for the branch router 114 to select a WAN path 152, 154 to determine bandwidth capacity and initiate the adaptive active bandwidth measurement test, one of two conditions must be satisfied. First, if the bandwidth utilization of the WAN path 152, 154 exceeds a pre-determined maximum threshold, the branch router 114 may initiate the adaptive active bandwidth measurement test. In an embodiment, the bandwidth monitoring module 180 may monitor the bandwidth utilization of WAN path 152, 154 to determine whether it exceeds a certain percentage of the default capacity, e.g., 95%. In another embodiment, the bandwidth monitoring module 180 may require bandwidth utilization to exceed a certain percentage while maintaining a certain a performance score, e.g., vQoE score associated with a GREEN performance grade (indicating good performance of the WAN path 152, 154). Second, if the QoE monitoring module determines that the performance of the WAN path 152, 154 has degraded below a pre-determined minimum threshold, e.g., the numeric performance score (vQoE score) of the WAN path 152, 154 is below 5 and/or the performance grade is RED (indicating poor performance of the WAN path 152, 154), the branch router 114 may initiate the adaptive active bandwidth measurement test.

If the first condition is satisfied (i.e., bandwidth utilization for a WAN path 152, 154 exceeds a pre-determined threshold and the performance score (vQoE score) is GREEN), the adaptive active bandwidth measurement test may be initiated, wherein the following three operations may commence: initiating a controlled speed test, conducting a QoE performance measurement, and verifying and updating the bandwidth. In an embodiment, the adaptive active bandwidth measurement test may be a closed process and the three operations may together comprise one cycle of the adaptive active bandwidth measurement test.

The first operation of the adaptive active bandwidth measurement test is the controlled speed test. The branch router 114 may initiate the controlled speed test by applying a test load (also referred to as the speed test flow) on the WAN path 152, 154. By way of example, the path of the controlled speed test is indicated by element 156 in FIG. 1, and may correspond to WAN path 152, 154. Importantly, the controlled speed test will not be subject to the QoS shaper. While the QoS shaper generally oversees all traffic, the QoS shaper 170 may be bypassed by the controlled speed test to determine whether bandwidth availability is greater than what the QoS shaper allows, i.e., the actual bandwidth capacity. Similarly, the controlled speed test may be conducted concurrently and without impact to existing user traffic. This may be accomplished by algorithms differentiating the user traffic from the simulated speed test flows.

After a test load is applied on the WAN path 152, 154, a QoE performance measurement may be determined by the QoE calculation module 192 of the QoE monitoring module 190. The QoE performance measurement may comprise the calculation of a performance score (e.g., a vQoE score) based on active and passive metrics, as discussed above. The performance score (vQoE score) may correspond to a performance grade (GREEN, YELLOW, or RED) of the WAN path 152, 154. Based on the performance score (vQoE score) and/or performance grade of the WAN path 152, 154, the bandwidth may be verified by the bandwidth monitoring module 180 and the QoS shaper may be updated by the QoS shaper module 170. For example, if the performance score (vQoE score) of the WAN path corresponds to a GREEN performance grade, the QoS shaper may be increased by the QoS shaper module 170; if the performance score (vQoE score) of the WAN path corresponds to a YELLOW performance grade, the QoS shaper may be maintained by the QoS shaper module 170; if the performance score (vQoE score) of the WAN path corresponds to a RED performance grade, the QoS shaper may be decreased by the QoS shaper module 170. In an embodiment, the three operations, i.e., the controlled speed test, the QoE performance measurement, and the bandwidth verification and update, may constitute one cycle of the adaptive active bandwidth measurement test. The cycle may be repeated, as needed, based on factors such as bandwidth performance, results of the adaptive active bandwidth measurement test, etc. For example, if the performance grade of the WAN path is GREEN during a given cycle of the adaptive active bandwidth measurement test (indicating good path performance), the adaptive active bandwidth measurement test may be repeated. In the next cycle, the test load applied by the controlled speed test on the WAN path 152, 154 may be incrementally increased, the performance measured, and the bandwidth verified and the QoS shaper updated. Therefore, continued good performance of the WAN path 152, 154 after one or more cycles of the adaptive active bandwidth measurement test may allow for a steady, incremental increase in the bandwidth of the QoS shaper until it is stabilized at its maximum capability.

In accordance with the present disclosure and as described above, the adaptive active bandwidth measurement test may be repeated until the incremental increase of the test load on the WAN path 152, 154 results in a downgrade of the performance score (vQoE score) to a threshold value. In an embodiment, and by way of example, if a WAN path has a default capacity of 50 Mbps, the branch router 114 may initiate the controlled speed test and, in each cycle of the adaptive bandwidth measurement test, the controlled speed test may incrementally increase the test load by 0.5 Mbps (1% of default capability). In other embodiments, the controlled speed test may incrementally increase the test load by 2.5 Mbps (5% of default capability). After each incremental increase of the speed test load by the controlled speed test, the QoE calculation module 192 of the QoE monitoring module 190 may calculate QoE metrics for the path 152, 154 and assign a corresponding performance score (vQoE score). Then, the QoE performance evaluation module 194 may evaluate the score and assign a performance grade based on the score. For example, if the performance score (vQoE) score is between 8-10, a performance grade of GREEN may be assigned, and the bandwidth may be verified by the bandwidth monitoring module 180 and the QoS shaper may be increased by the QoS shaper module 170. Then, the cycle may be repeated, and the next increment of test load may be applied to the path. The foregoing steps—incrementally increasing the load, calculating and assigning a performance score (vQoE score) and/or performance grade to the WAN path 152, 154, and verifying and increasing the bandwidth of the QoS shaper—may be repeated as long as the performance score and/or grade indicates good path performance.

In another embodiment, each incremental increase of load (e.g., by 0.5 Mbps) applied by the controlled speed test may be followed by a QoE performance measurement, and a verification of the bandwidth, without an immediate update to the QoS shaper. For example, after completion of a controlled speed test and a QoE performance measurement, if the performance score (vQoE score) is between 8-10 (indicating a GREEN performance grade), the system may commence to verify the bandwidth (i.e., determine the amount by which the QoE shaper bandwidth may be successfully increased). Then, rather than updating the QoE shaper, the system may initiate another controlled speed test wherein the next incremental load (e.g., 0.5 Mbps) may be applied to the WAN path 152, 154. Once the test load has been successfully increased and the QoE performance has been measured a predetermined number of times (e.g., 5 times) without performance downgrade (vQoE score remains GREEN) and with no Service Level Agreement (SLA) violations, the shaper rate of the QoS shaper 170 may then be increased by the total determined amount (e.g., by 2.5 Mbps, or 5% of default capacity). According to this embodiment and by way of example, five incremental increases in the test load in conjunction with five corresponding QoE performance measurements may correspond to a full cycle of the adaptive active bandwidth measurement test. If, at any point during the cycle, the performance score (vQoE score) shows degradation (for example, the vQoE score downgrades to a YELLOW performance grade), the adaptive active measurement test may be aborted and the QoS shaper rate may be maintained by the QoS shaper module 170 at its last verified good rate.

With respect to the second condition by which an adaptive active bandwidth measurement test may be initiated, i.e., performance of the WAN path 152, 154 has degraded below a pre-determined minimum threshold (e.g., the numeric performance score (vQoE score) of the WAN path 152, 154 is below 5 and/or the performance grade is RED, indicating poor performance of the WAN path 152, 154), the adaptive active bandwidth measurement test may be initiated with a controlled speed test having a minimal test load utilizing minimal bandwidth. By way of example, for a WAN path having a baseline capacity of 50 Mbps, the minimal test load may comprise 1 Mpbs (2% of the total baseline capability). If the controlled speed test fails without a successful throughput of a test load of 1 Mbps, or if the performance score (vQoE score) for the WAN path continues to degrade, the branch router 114 may instruct the QoS shaper module to decrease the QoS shaper rate by a pre-determined percentage, e.g., 2%.

Figure 2:
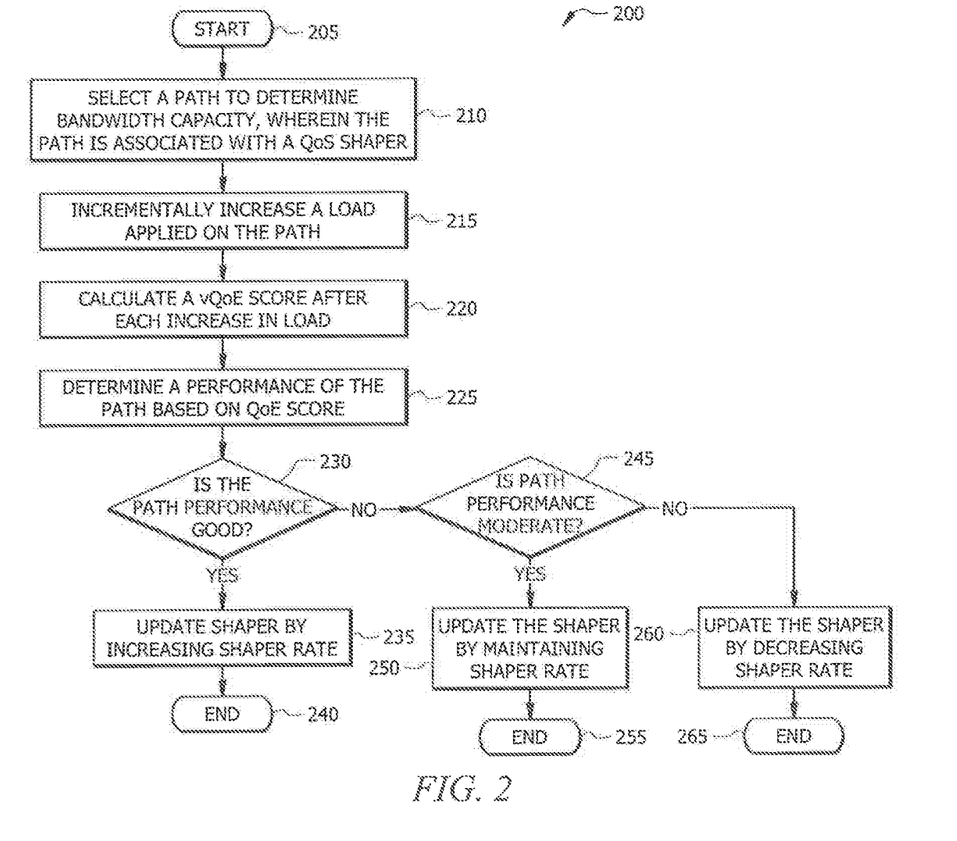
FIG. 2 illustrates a flow diagram of a method for determining bandwidth capacity of a WAN path, in accordance with certain embodiments.

Reference is now made to FIG. 2, wherein is shown a method 200 for determining bandwidth capacity of a WAN path using an adaptive active bandwidth measurement test based on the three operations described (i.e., initiating a controlled speed test, conducting a QoE performance measurement, and verifying and updating the bandwidth), in accordance with the present disclosure. The method may begin at step 205. At step 210, a WAN path may be selected for which to determine bandwidth capacity. The WAN path may be selected based on satisfaction of one or more conditions relating to bandwidth utilization and/or performance of the path. The conditions for selection of the WAN path are described above in conjunction with FIG. 1. In an embodiment, the WAN path may be selected because its bandwidth utilization exceeds a pre-determined maximum threshold. By way of example, the WAN path may be selected if its bandwidth utilization exceeds a certain percentage of the default capacity, e.g., 95%. In another example, the WAN path may be selected if its bandwidth utilization exceed a certain percentage and its performance score and/or performance grade indicates good path performance. In another embodiment, the WAN path may be selected because its performance has degraded below a pre-determined minimum threshold. For example, the WAN path may be selected if its performance score indicates poor performance (the numeric performance score (vQoE score) of the WAN path is below 5 and/or the performance grade is RED). The determination of the performance score and/or performance grade of the WAN path is discussed above with respect to FIG. 1, as well as in conjunction with steps 220 and 225 below. The selected WAN path may be associated with a QoS shaper having a pre-determined shaper rate. The QoS shaper may manage traffic flow on the selected WAN path by allocating bandwidth to traffic based priority.

At step 215, an adaptive active bandwidth measurement test may be initiated, and a controlled speed test may incrementally increase a test load applied on the selected path. The test load may be applied concurrently with existing user traffic and may be configured to bypass one or more policies of the QoS shaper. The rate of the test load may correspond to a percentage of the default capacity of the WAN path. For example, for a WAN path having a default capacity of 50 Mbps, the test load may comprise 0.5 Mbps (1% of the default capacity of the WAN path), or up to 2.5 Mbps (5% of the default capacity of the WAN path).

At step 220, after each increase in the test load, a QoE performance measurement may be determined wherein a performance score, such as a vQoE score, may be calculated for the WAN path. The performance score (e.g., vQoE score) may comprise a composite calculation based on active and passive metrics. Active metrics may include metrics associated with the transmission of the test load, including by way of example, metrics relating to jitter, loss, delay, and latency, which may be measured by bidirectional forwarding detection or other means known in the art. Passive metrics may include metrics associated with concurrent user traffic traversing the WAN path. In some embodiments, active and passive metrics may comprise metrics associated with bidirectional forwarding detection protocols used by application-aware routing (e.g., Cisco BFD App-route), controlled speed test with simulated flows, and/or passive application visibility and control (AVC) performance monitoring (including monitoring of customer Transmission Control Protocol and/or User Datagram Protocol (TCP/UDP) data flows).

At step 225, the performance of the WAN path may be determined based on the calculated performance score (e.g., vQoE score). In an embodiment, the calculated performance score (vQoE score) may correspond to one of a plurality of performance grades indicating the performance of the WAN path. For example, a vQoE score may comprise a numeric value ranging from 0 to 10. A vQoE score of 8 or greater (vQoE≥8) may correspond to a GREEN performance grade and may indicate good performance of the WAN path. A vQoE score ranging from 5 to a value less than 8 (5≤vQoE<8) may correspond to a YELLOW performance grade and may indicate average or moderate performance of the WAN path. A vQoE score less than 5 (vQoE<5) may correspond to a RED performance grade and may indicate poor performance of the WAN path.

At step 230, the bandwidth may be verified wherein a determination may be made as to whether the performance of the WAN path is good. If the performance of the WAN path, as determined by the performance score (vQoE score) is good, then at step 235, the QoS shaper may be updated by increasing the shaper rate. At step 240, the method may end.

If, at step 230, the performance of the WAN path, as determined by the performance score (vQoE score) is not good, then at step 245, a determination may be made as to whether the performance of the WAN path is average or moderate. If the performance of the WAN path, as determined by the performance score (vQoE score) is average or moderate, then at step 250, the QoS shaper may be updated by maintaining the shaper rate. At step 255, the method may end.

If, at step 245, the performance of the WAN path, as determined by the performance score (vQoE score) is not average or moderate, then at step 260, it may be concluded that the performance of the path is bad and the QoS shaper may be updated by decreasing the shaper rate. At step 265, the method may end.

Figure 3:
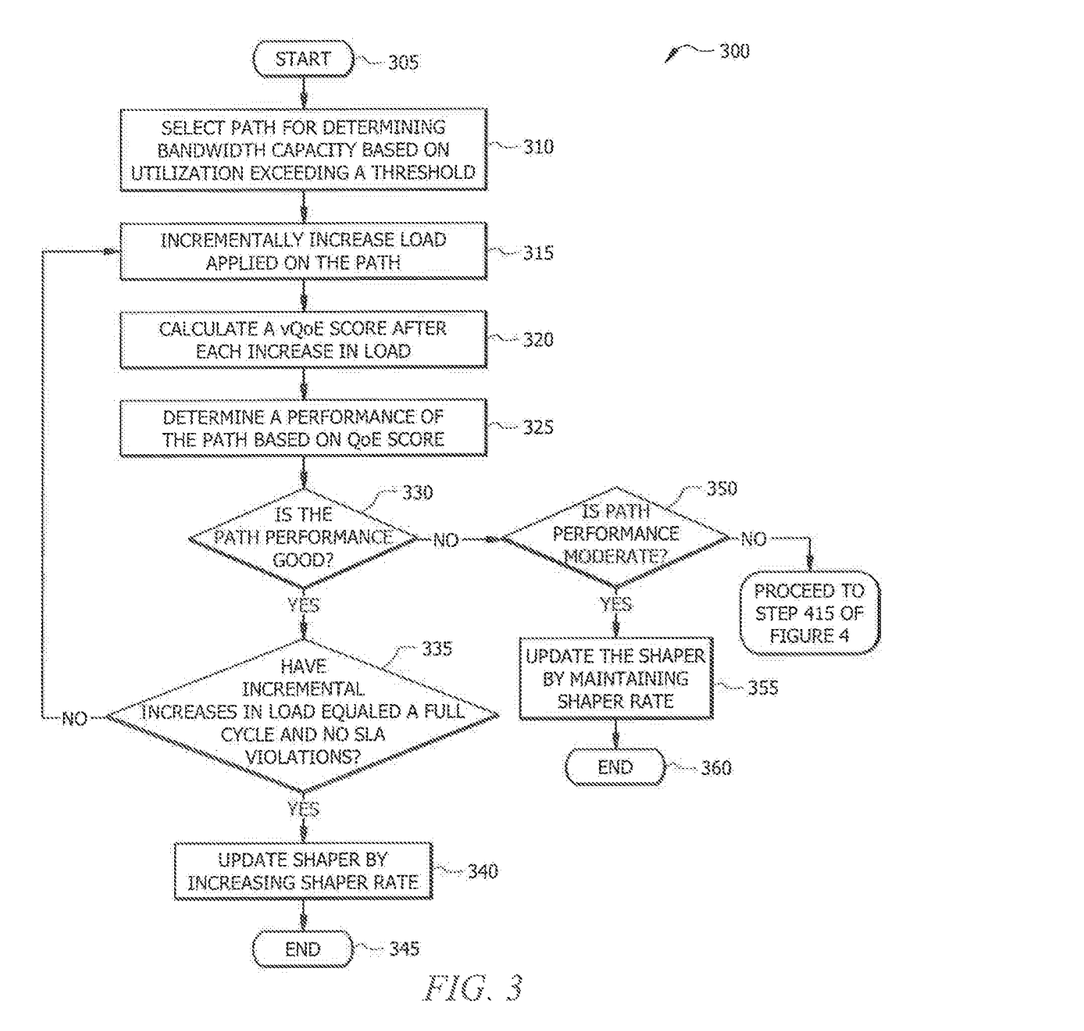
FIG. 3 illustrates a flow diagram of an alternate method for determining bandwidth capacity of a WAN path, in accordance with certain embodiments.

Reference is now made to FIG. 3, wherein in shown a method 300 for determining bandwidth capacity of a WAN path using an adaptive active bandwidth measurement test based on three operations (a controlled speed test, QoE performance measurement, and bandwidth verification) wherein the adaptive bandwidth measurement test is initiated when the bandwidth utilization of the WAN path exceeds a pre-determined maximum threshold. The method may begin at step 305. At step 310, a WAN path may be selected for determining bandwidth capacity. The WAN path may be selected because its bandwidth utilization exceeds a pre-determined maximum threshold. By way of example, the WAN path may be selected if its bandwidth utilization exceeds a certain percentage of the default capacity, e.g., 95%. In another embodiment, the WAN path may be selected if its bandwidth utilization exceed a certain percentage and its performance score and/or performance grade indicates good path performance. The selected WAN path may be associated with a QoS shaper having a pre-determined shaper rate.

At step 315, an adaptive active bandwidth measurement test may be initiated, and a controlled speed test may incrementally increase a test load applied on the selected WAN path. The test load may be applied concurrently with existing user traffic and may be configured to bypass one or more policies of the QoS shaper. The rate of the test load may correspond to a percentage of the default capacity of the WAN path. For example, each incremental increase in the test load may be 1% of the default capacity of the WAN path.

At step 320, after each increase in the test load, a QoE performance measurement may be determined wherein a performance score (e.g., a vQoE score) may be calculated for the WAN path. The performance score (vQoE score) may comprise a composite calculation based on active and passive metrics, as discussed above in conjunction with FIGS. 1 and 2. At step 325, the performance of the WAN path may be determined based on the calculated performance score (vQoE score). As described above, the calculated performance score (vQoE score) may correspond to one of a plurality of performance grades indicating the performance of the WAN path. For example, the vQoE score may comprise a numeric value ranging from 0 to 10. A vQoE score of 8 or greater (vQoE≥8) may correspond to a GREEN performance grade and may indicate good performance of the WAN path. A vQoE score ranging from 5 to a value less than 8 (5≤vQoE<8) may correspond to a YELLOW performance grade and may indicate average or moderate performance of the WAN path. A vQoE score less than 5 (vQoE<5) may correspond to a RED performance grade and may indicate poor performance of the WAN path.

At step 330, the bandwidth may be verified wherein a determination may be made as to whether the performance of the WAN path is good (i.e., the performance grade is GREEN). If the performance of the WAN path is good, then at step 335, a determination may be made as to whether the number of incremental increases in the test load and the corresponding performance score (vQoE score) calculations indicating good path performance have completed one full cycle of the adaptive active bandwidth measurement test and there have been no SLA violations or vQoE degradations. In an embodiment and by way of example, five incremental increases in the test load in conjunction with five corresponding calculations of performance scores (vQoE scores) may complete a full cycle of the adaptive active bandwidth measurement test.

If, at step 335, it is determined that the number of incremental increases in test load and the corresponding number of performance score calculations indicating good path performance has not completed one full cycle, the method may return to step 315, wherein the next incremental increase in test load is applied on the selected WAN path. If, at step 335, it is determined that the number of incremental increases in test load and the corresponding number of performance score calculations indicating good path performance corresponds to a full cycle of the adaptive active bandwidth measurement test and there have been no SLA violations or vQoE degradations, the method may proceed to step 340, wherein the QoS shaper may be updated by increasing the shaper rate. At step 345, the method may end.

At step 330, if it is determined that the performance of the WAN path is not good (i.e., the performance grade is not GREEN), the method may proceed to step 350, wherein a determination may be made as to whether the performance of the WAN path is moderate or average (i.e., the performance grade is YELLOW). If the performance of the WAN path is moderate, then at step 355, the QoS shaper may be updated by maintaining its current shaper rate. At step 360, the method may end.

Figure 4:
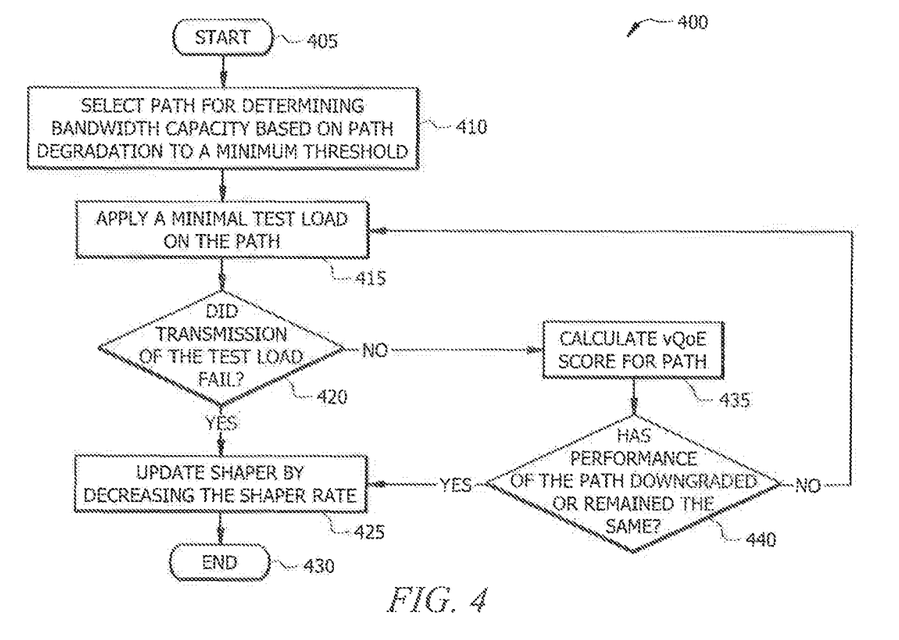
FIG. 4 illustrates a flow diagram of an alternate method for determining bandwidth capacity of a WAN path, in accordance with certain embodiments.

At step 350, if it is determined that the performance of the WAN path is not moderate (i.e., the performance grade of the WAN path is not YELLOW), it may be concluded that the performance of the WAN path has degraded to poor (i.e., the performance grade is RED) and the method may proceed to step 415 of FIG. 4.

Reference is now made to FIG. 4, wherein is shown a detailed method 400 for determining bandwidth capacity of a WAN path using an adaptive active bandwidth measurement test based on three operations (a controlled speed test, QoE performance measurement, and bandwidth verification), wherein the adaptive bandwidth measurement test is initiated when the performance of the WAN path has degraded below a pre-determined minimum threshold. The method may begin at step 405. At step 410, a WAN path may be selected because its existing performance has degraded below a pre-determined minimum threshold. By way of example, the performance score (e.g., vQoE score) of the WAN path may be below 5 indicating that the performance of the WAN path is poor (i.e., the performance grade of the WAN path is RED). The determination of the performance score and/or performance grade of the WAN path is discussed above with respect to FIGS. 1 and 2. The selected WAN path may be associated with a QoS shaper having a pre-determined shaper rate.

At step 415, an adaptive active bandwidth measurement test may be initiated with a controlled speed test, wherein a minimal test load may be applied on the WAN path. The minimal test load applied may correspond to, for example, 2% of the baseline capacity of the WAN path, e.g., 1 Mbps if the baseline capacity is 50 Mbps.

At step 420, a determination may be made as to whether the transmission of the minimal test load across the WAN path failed. If it is determined that the controlled speed test failed (i.e., that the minimal test load was not successfully transmitted through the WAN path), the method may proceed to step 425 wherein the QoS shaper may be updated by decreasing its shaper rate. At step 430, the method may end.

If, at step 420, it is determined that the controlled speed test transmitting the minimal test load did not fail, the method may proceed to step 435, and a QoE performance measurement may be determined wherein a performance score (e.g., vQoE score) may be calculated for the WAN path. At step 440, the bandwidth is verified wherein a determination may be made as to whether the performance of the WAN path has downgraded (for example, from a score of 5 to a score of 4), or stayed the same (remaining at a score of 5, which corresponds to a performance grade of RED). If, at step 440, the performance of the WAN path has downgraded or stayed the same, the method proceeds to step 425, wherein the QoS shaper may be updated by decreasing its shaper rate. If, at step 440, the performance of the WAN path has not downgraded or stayed the same, the method may proceed to step 415 and another minimal test load may be applied to the WAN path in accordance with the controlled speed test.

In sum, in accordance with the systems and methods described in conjunction with FIGS. 1-4, the adaptive active bandwidth measurement test generally comprising the three operations of initiating a controlled speed test, conducting a QoE performance measurement, and verifying and/or updating the bandwidth, may result in the determination of the actual active bandwidth of a WAN path and may allow for the improvement of traffic flow in the WAN path. Because an adaptive active bandwidth measurement test cycle may be competed in a matter of minutes, the system may continue to monitor and update the parent shaper, as needed, when the available bandwidth changes.

It is be understood that although the present disclosure, e.g., FIG. 1, describes and depicts the methods and systems of the present invention in conjunction with a branch WAN path (such as a DIA/DCA branch link), the concepts of the present disclosure may be extended to other paths and links in an SD-WAN network. By way of example, the methods and systems of the present disclosure may be adapted to determine bandwidth capacity in a hub/spoke topology, a mesh topology, and other enterprise use cases.

Figure 5:
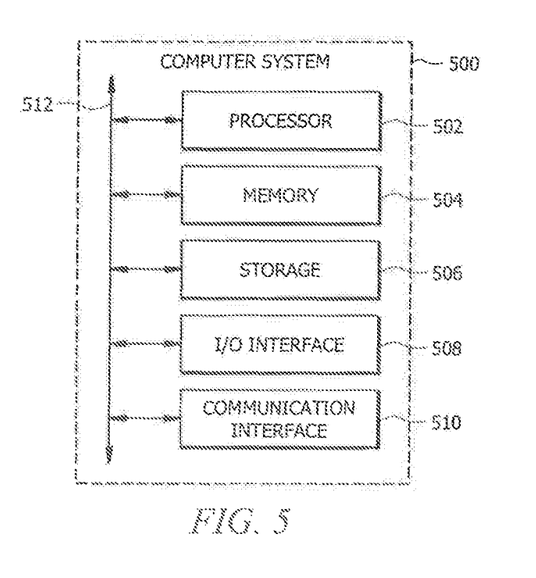
FIG. 5 illustrates a computer system, in accordance with certain embodiments.

Reference is now made to FIG. 5, wherein is shown an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502, The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:
1. A system, comprising:
one or more processors; and
one or more computer-readable non-transitory storage media comprising instructions that, when executed by the one or more processors, cause one or more components of the system to perform operations comprising:
selecting a software-defined wide-area network (SD-WAN) path for which to determine bandwidth capacity, wherein the path is associated with a Quality of Service (QoS) shaper having a pre-determined shaper rate;
incrementally increasing a test load applied on the selected path, wherein the test load is applied con- currently with existing user traffic and is operable to bypass one or more policies of the QoS shaper;

calculating a performance score for the path after each increase in the test load;

determining a performance of the path based on the calculated performance score; and updating the shaper rate of the QoS shaper based on the performance of the path.

2. The system of claim 1, wherein the path is selected when a bandwidth utilization of the path exceeds a pre-determined maximum threshold.

3. The system of claim 1, wherein the path is selected when a current performance of the path is degraded below a pre-determined minimum threshold.

4. The system of claim 1, wherein the performance score comprises:

a Quality of Experience score based on a numerical composite calculation derived from active and passive performance metrics, wherein the active performance metrics are associated with the test load, and the passive performance metrics are associated with the existing user traffic traversing the SD-WAN path.

5. The system of claim 1, wherein the calculated performance score corresponds to one of a plurality of performance grades indicating the performance of the path.

6. The system of claim 1, wherein the step of updating the shaper rate comprises one of increasing the shaper rate, decreasing the shaper rate, or maintaining the shaper rate.

7. A method, comprising:

selecting a software-defined wide-area network (SD-WAN) path on which to measure bandwidth capacity, wherein the path is associated with a Quality of Service (QoS) shaper having a pre-determined shaper rate;

incrementally increasing a test load applied on the selected path, wherein the test load is applied concurrently with existing user traffic and is operable to bypass one or more policies of the QoS shaper;

calculating a performance score for the path after each increase in the test load;

determining a performance of the path based on the calculated performance score; and updating the shaper rate of the QoS shaper based on the performance of the path.

8. The method of claim 7, wherein the path is selected when a bandwidth utilization of the path exceeds a pre-determined maximum threshold.

9. The method of claim 7, wherein the path is selected when a current performance of the path is degraded below a pre-determined minimum threshold.

10. The method of claim 7, wherein the performance score comprises:

a Quality of Experience score based on a numerical composite calculation derived from active and passive performance metrics, wherein the active performance metrics are associated with the test load, and the passive performance metrics are associated with the existing user traffic traversing the SD-WAN path.

11. The method of claim 7, wherein the calculated performance score corresponds to one of a plurality of performance grades indicating the performance of the path.

12. The method of claim 7, wherein the step of updating the shaper rate comprises one of increasing the shaper rate, decreasing the shaper rate, or maintaining the shaper rate.

13. One or more computer-readable non-transitory storage media embodying instructions that, when executed by a processor, cause the performance of operations comprising:

selecting a software-defined wide-area network (SD-WAN) path on which to measure bandwidth capacity, wherein the path is associated with a Quality of Service (QoS) shaper having a pre-determined shaper rate;

incrementally increasing a test load applied on the selected path, wherein the test load is applied concurrently with existing user traffic and is configured to bypass one or more policies of the QoS shaper;

calculating a performance score for the path after each increase in the test load;

determining a performance of the path based on the calculated performance score; and updating the shaper rate of the QoS shaper based on the performance of the path.

14. The one or more computer-readable non-transitory storage media of claim 13, wherein the path is selected when a bandwidth utilization of the path exceeds a pre-determined maximum threshold.

15. The one or more computer-readable non-transitory storage media of claim 13, wherein the path is selected when a current performance of the path is degraded below a pre-determined minimum threshold.

16. The one or more computer-readable non-transitory storage media of claim 13, wherein the performance score comprises:

a Quality of Experience score based on a numerical composite calculation derived from active and passive performance metrics, wherein the active performance metrics are associated with the test load, and the passive performance metrics are associated with the existing user traffic traversing the SD-WAN path.

17. The one or more computer-readable non-transitory storage media of claim 13, wherein the step of updating the shaper rate comprises one of increasing the shaper rate, decreasing the shaper rate, or maintaining the shaper rate.

* * * * *